United States Patent
Yang et al.

(10) Patent No.: US 12,394,808 B2
(45) Date of Patent: Aug. 19, 2025

(54) HUMIDIFIER FOR FUEL CELL

(71) Applicant: KOLON INDUSTRIES, INC., Seoul (KR)

(72) Inventors: Hyoung Mo Yang, Seoul (KR); Woong Jeon Ahn, Seoul (KR); Do Woo Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 468 days.

(21) Appl. No.: 17/995,481

(22) PCT Filed: Nov. 8, 2021

(86) PCT No.: PCT/KR2021/016112
§ 371 (c)(1),
(2) Date: Oct. 5, 2022

(87) PCT Pub. No.: WO2022/145692
PCT Pub. Date: Jul. 7, 2022

(65) Prior Publication Data
US 2023/0178766 A1  Jun. 8, 2023

(30) Foreign Application Priority Data
Dec. 29, 2020 (KR) .......... 10-2020-0186347

(51) Int. Cl.
*H01M 8/04* (2016.01)
*B01D 63/02* (2006.01)
(Continued)

(52) U.S. Cl.
CPC ........ *H01M 8/04149* (2013.01); *B01D 63/02* (2013.01); *H01M 8/04141* (2013.01); *H01M 2008/1095* (2013.01)

(58) Field of Classification Search
CPC .............. B01D 63/02; H01M 8/04141; H01M 8/04149
See application file for complete search history.

(56) References Cited

U.S. PATENT DOCUMENTS 9,209,467 B2 * 12/2015 Kim .................. H01M 8/04141

FOREIGN PATENT DOCUMENTS

| JP | 2001201120 A | 7/2001 |
| JP | 2007046801 A | 2/2007 |

(Continued)

OTHER PUBLICATIONS

The search report dated Oct. 9, 2024, related to the corresponding European Patent application.

*Primary Examiner* — Robert A Hopkins
(74) *Attorney, Agent, or Firm* — Harvest IP Law, LLP

(57) ABSTRACT

The present invention relates to a humidifier for a fuel cell, the humidifier comprising: a humidifying module for humidifying a dry gas, supplied from the outside, by using a wet gas discharged from a fuel cell stack; a first cap coupled to one end of the humidifying module; and a second cap coupled to the other end of the humidifying module. The humidifying module includes: a mid-case, both ends of which are open; and at least one cartridge that is located inside the mid-case and includes a plurality of hollow fiber membranes. The distance between a second gas inlet and a second gas outlet, which are formed in an inner case of the cartridge, is greater than the distance between a first gas inlet and a first gas outlet, which are formed in the mid-case.

15 Claims, 7 Drawing Sheets

(51) Int. Cl.
*H01M 8/04119* (2016.01)
*H01M 8/10* (2016.01)

(56) References Cited

FOREIGN PATENT DOCUMENTS

| | | |
|---|---|---|
| JP | 5135844 B2 | 2/2013 |
| KR | 20140038223 A | 3/2014 |
| KR | 20160150414 A | 12/2016 |
| KR | 20190081736 A | 7/2019 |

\* cited by examiner

HUMIDIFIER FOR FUEL CELL

CROSS REFERENCE TO RELATED APPLICATIONS

This application is a National Stage of International Application No. PCT/KR2021/016112 filed Nov. 8, 2021, claiming priority based on Korean Patent Application No. 10-2020-0186347 filed Dec. 29, 2020, the disclosures of which are incorporated herein by reference in their entireties.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 1200 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 111b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method. The fixing layers 113, in which opposite ends of the hollow fiber membranes 112 are potted, and resin layers 114 provided between the fixing layers 113 and the mid-case 111 isolate the inner spaces of the caps 120 from the inner space of the mid-case 111. Similarly to the fixing layers 113, each of the resin layers 114 is generally formed by hardening a liquid polymer, such as liquid polyurethane resin, using a casting method.

Air supplied from the outside flows along hollow parts of the hollow fiber membranes 112. Off-gas introduced into the mid-case 111 through the off-gas inlet 111a comes into contact with the outer surfaces of the hollow fiber membranes 112, and is discharged from the mid-case 111 through the off-gas outlet 111b. When the off-gas comes into contact with the outer surfaces of the hollow fiber membranes 112, moisture contained in the off-gas is transmitted through the hollow fiber membranes 112 to humidify air flowing along the hollow parts of the hollow fiber membranes 112.

In this case, conventionally, the off-gas introduced into the mid-case 111 flows toward the hollow fiber membranes 112. Conventionally, therefore, the pressure of the off-gas introduced into the mid-case 111 is directly applied to the hollow fiber membranes 112, whereby the hollow fiber membranes 112 are damaged or broken.

DISCLOSURE

Technical Problem

The present disclosure has been made in view of the above problems, and it is an object of the present disclosure to provide a humidifier for fuel cells capable of reducing damage to or breakage of hollow fiber membranes.

Technical Solution

In order to accomplish the above object, the present disclosure may include the following construction.

A humidifier for fuel cells according to the present disclosure may include a humidifying module configured to humidify dry gas supplied from the outside using wet gas discharged from a fuel cell stack, a first cap coupled to one end of the humidifying module, and a second cap coupled to the other end of the humidifying module. The humidifying module may include a mid-case open at opposite ends thereof and at least one cartridge disposed in the mid-case, wherein the cartridge may include a plurality of hollow fiber membranes. The cartridge may include an inner case open at opposite ends thereof, wherein the hollow fiber membranes may be received in the inner case. The mid-case may include a first gas inlet and a first gas outlet, wherein the first gas inlet and the first gas outlet may be formed spaced apart from each other in a first-axis direction. The inner case may include a second gas inlet and a second gas outlet, wherein the second gas inlet and the second gas outlet may be formed spaced apart from each other in the first-axis direction. The distance between the second gas inlet and the second gas outlet may be greater than the distance between the first gas inlet and the first gas outlet in the first-axis direction.

Advantageous Effects

In the present disclosure, it is possible to reduce a danger of hollow fiber membranes being damaged or broken by the pressure of gas. In the present disclosure, therefore, it is possible to extend lifespan and to reduce maintenance expenses.

BEST MODE

Hereinafter, embodiments of a humidifier for fuel cells according to the present disclosure will be described in detail with reference to the accompanying drawings. Meanwhile, in FIGS. 7 to 10, two parallel curved lines are omission lines.

Figure 1:
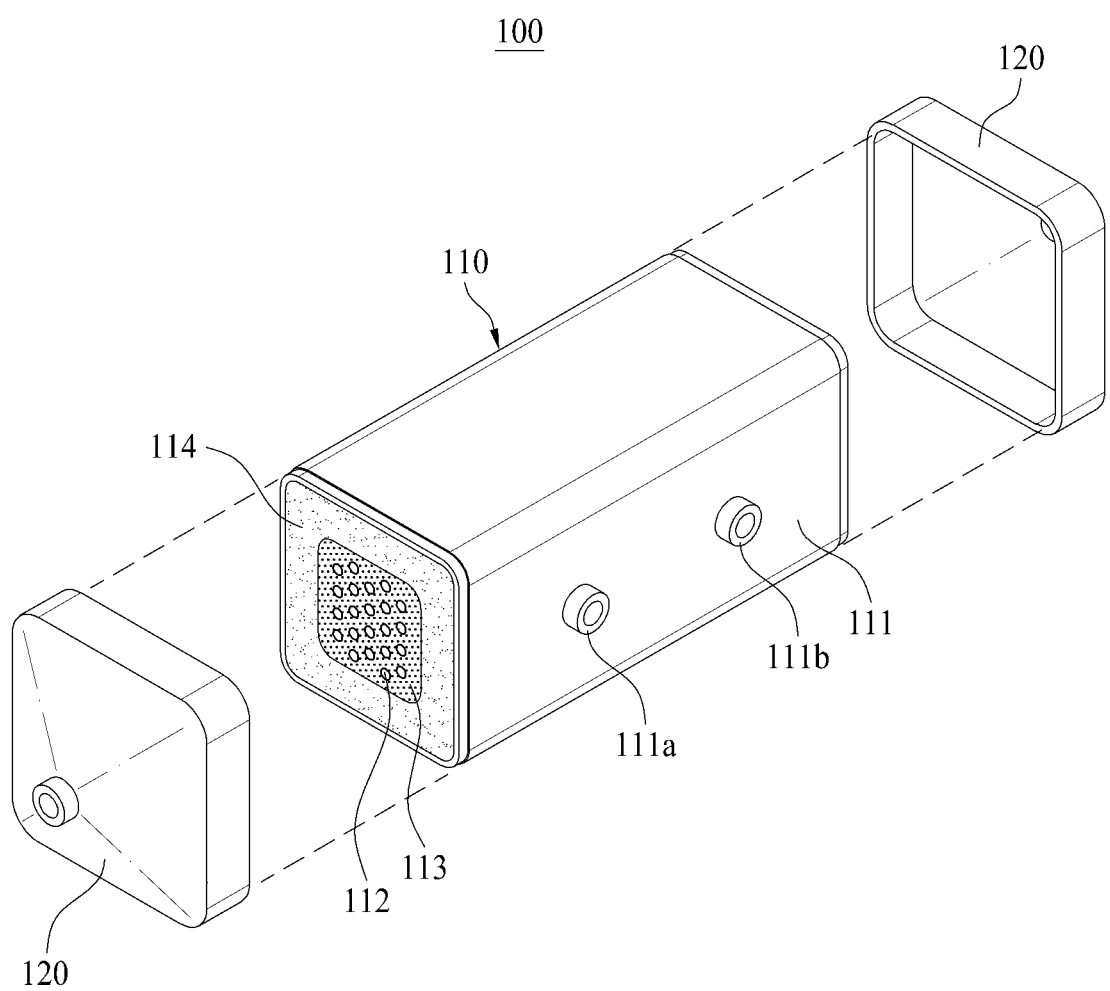
FIG. 1 is a schematic exploded perspective view of a conventional humidifier for fuel cells.
Figure 2:
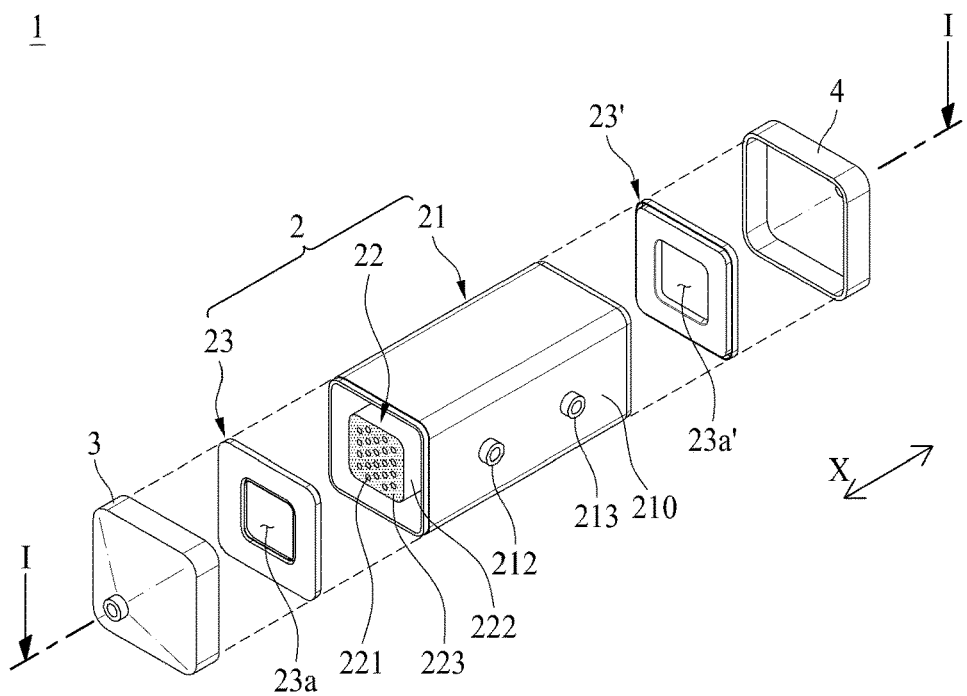
FIG. 2 is a schematic exploded perspective view of a humidifier for fuel cells according to the present disclosure.
Figure 3:
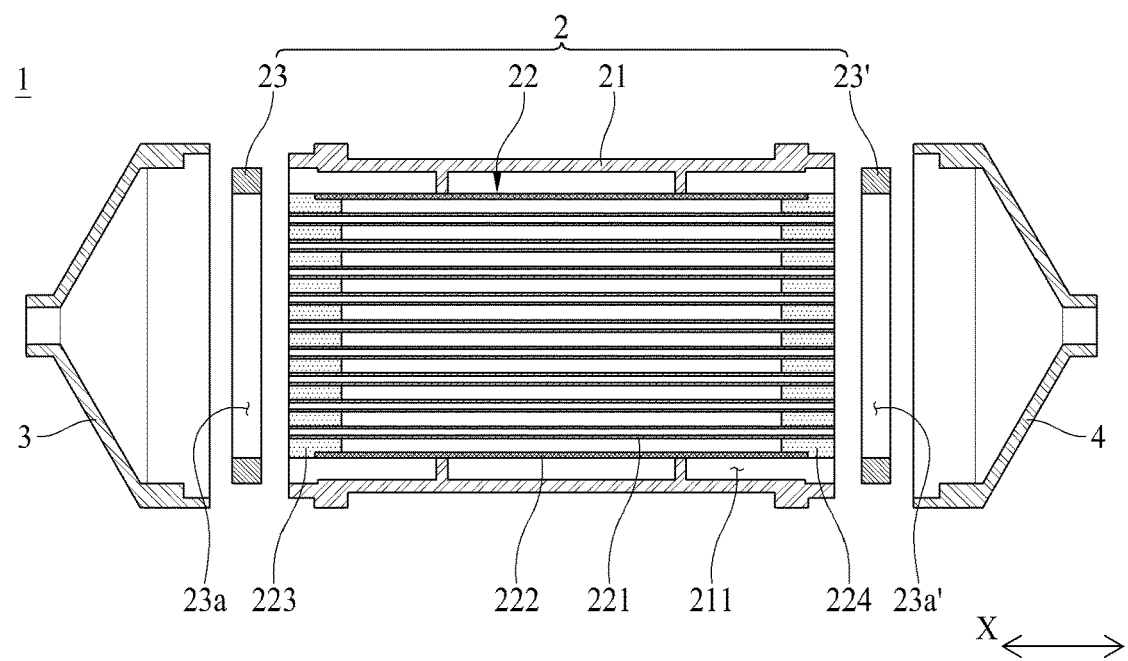
FIG. 3 is a schematic exploded sectional view showing the humidifier for fuel cells according to the present disclosure, taken along line I-I of FIG. 2.
Figure 4:
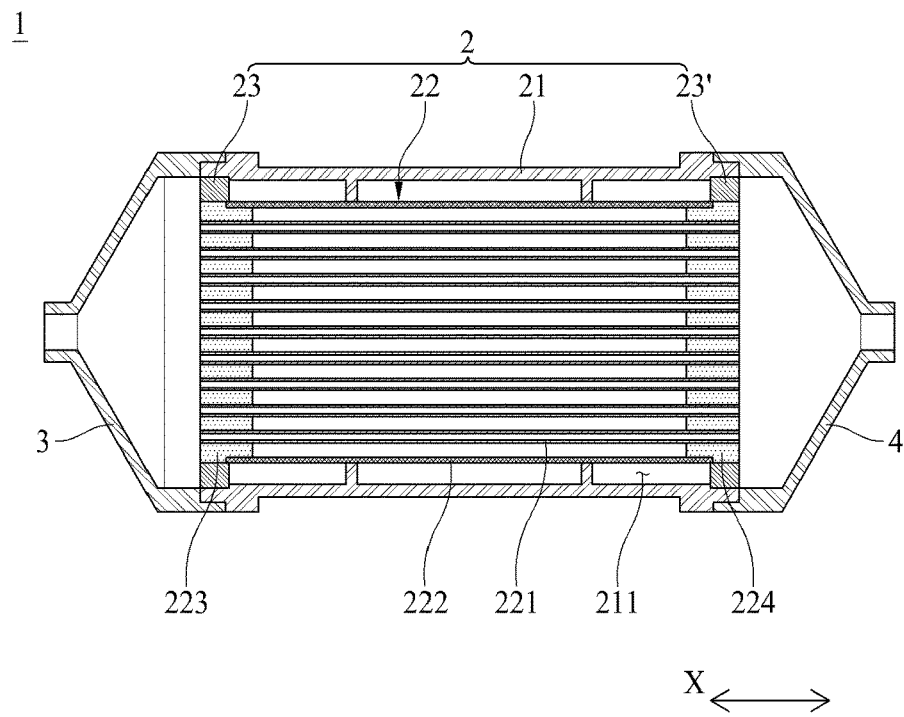
FIG. 4 is a schematic coupled sectional view showing the humidifier for fuel cells according to the present disclosure, taken along line I-I of FIG. 2.

Referring to FIGS. 2 to 4, a humidifier 1 for fuel cells according to the present disclosure humidifies dry gas supplied from the outside using wet gas discharged from a fuel cell stack (not shown). The dry gas may be fuel gas or air. After being humidified by the wet gas, the dry gas may be supplied to the fuel cell stack. The humidifier 1 for fuel cells according to the present disclosure includes a humidifying module 2 configured to humidify dry gas, a first cap 3 coupled to one end of the humidifying module 2, and a second cap 4 coupled to the other end of the humidifying module 2.

Referring to FIGS. 2 to 4, the humidifying module 2 humidifies dry gas supplied from the outside. The first cap 3 may be coupled to one end of the humidifying module 2. The second cap 4 may be coupled to the other end of the humidifying module 2. The first cap 3 may transmit dry gas to the humidifying module 2. In this case, the second cap 4 may transmit the dry gas humidified by wet gas in the humidifying module 2 to the fuel cell stack. The first cap 3 may transmit wet gas to the humidifying module 2. In this case, the second cap 4 may discharge the wet gas, after humidification of dry air in the humidifying module 2, to the outside.

The humidifying module 2 includes a mid-case 21 and at least one cartridge 22.

The cartridge 22 is coupled to the mid-case 21. The cartridge 22 may be disposed in the mid-case 21. Opposite ends of the mid-case 21 are open. In this case, the mid-case 21 may include a receiving hole 211. The receiving hole 211 may be formed through the mid-case 21 in a first-axis direction (X-axis direction).

The mid-case 21 may include a first gas inlet 212 and a first gas outlet 213. The first gas inlet 212 may introduce wet gas or dry gas into the mid-case 21. The first gas outlet 213 may discharge wet gas or dry gas from the interior of the mid-case 21. The first gas inlet 212 and the first gas outlet 213 may be disposed at positions spaced apart from each other in the first-axis direction (X-axis direction).

When wet gas flows through the first gas inlet 212 and the first gas outlet 213, the wet gas may be supplied into the cartridge 22 via the interior of the mid-case 21 through the first gas inlet 212, and may come into contact with outer surfaces of the hollow fiber membranes 221 in the cartridge 22. During this process, moisture contained in the wet gas may be transmitted through the hollow fiber membranes 221, whereby dry gas flowing along hollow parts of the hollow fiber membranes 221 may be humidified. The humidified dry gas may be discharged from the hollow fiber membranes 221, and may be supplied to the fuel cell stack through the second cap 4. After humidifying the dry gas, the wet gas may be discharged from the cartridge 22, and may be discharged from the mid-case 21 through the first gas outlet 213 via the interior of the mid-case 21. The first gas inlet 212 may be connected to the fuel cell stack in order to receive wet gas. In this case, the wet gas may be off-gas discharged from the fuel cell stack.

When dry gas flows through the first gas inlet 212 and the first gas outlet 213, the dry gas may be supplied into the cartridge 22 via the interior of the mid-case 21 through the first gas inlet 212, and may come into contact with the outer surfaces of the hollow fiber membranes. During this process, moisture in wet gas flowing along the hollow parts of the hollow fiber membranes 221 may be transmitted through the hollow fiber membranes 221, whereby the dry gas introduced into the cartridge 22 may be humidified. The humidified dry gas may be discharged from the cartridge 22, be discharged from the mid-case 21 through the first gas outlet 213 via the interior of the mid-case 21, and may be supplied to the fuel cell stack. After humidifying the dry gas, the wet gas may be discharged from the hollow fiber membranes 221, and may be discharged to the outside through the second cap 4. The first cap 3 may be connected to the fuel cell stack in order to receive wet gas. In this case, the wet gas may be off-gas discharged from the fuel cell stack.

The first gas inlet 212 and the first gas outlet 213 may protrude from a mid-main body 210. The mid-main body 210 defines the overall external appearance of the mid-case 21. The first gas inlet 212 and the first gas outlet 213 may protrude from the mid-main body 210 in the same direction. The first gas inlet 212, the first gas outlet 213, and the mid-main body 210 may be integrally formed.

The cartridge 22 is disposed in the mid-case 21, and includes a plurality of hollow fiber membranes 221. The hollow fiber membranes 221 may be coupled to the cartridge 22 so as to be modularized. Consequently, the hollow fiber membranes 221 may be installed in the mid-case 21 through a process of coupling the cartridge 22 to the mid-case 21. In the humidifier 1 for fuel cells according to the present disclosure, therefore, ease in installation, separation, and replacement of the hollow fiber membranes 221 may be improved.

The cartridge 22 may include an inner case 222.

The inner case 222 has openings formed in ends thereof, and the plurality of hollow fiber membranes 221 is received in the inner case. The hollow fiber membranes 221 may be disposed in the inner case 222 so as to be modularized. Each of the hollow fiber membranes 221 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 22 may include a first fixing layer 223. The first fixing layer 223 fixes one end of each of the hollow fiber membranes 221. The first fixing layer 223 may close the opening of the inner case 222. In this case, the first fixing layer 223 may be formed so as not to block the hollow portions of the hollow fiber membranes 221. The first fixing layer 223 may be formed by hardening a liquid resin, such as liquid polyurethane resin, using a casting process. A portion of the first fixing layer 223 may be located in the inner case 222, and the remainder of the first fixing layer may protrude outwards from the inner case 222. The first fixing layer 223 may fix one end of each of the hollow fiber membranes 221 and the inner case 222 to each other.

The cartridge 22 may include a second fixing layer 224. The second fixing layer 224 fixes the other end of each of the hollow fiber membranes 221. The second fixing layer 224 may close the opening of the inner case 222. In this case, the second fixing layer 224 may be formed so as not to block the hollow portions of the hollow fiber membranes 221. The second fixing layer 224 may be formed by hardening a liquid resin, such as liquid polyurethane resin, using a casting process. A portion of the second fixing layer 224 may be located in the inner case 222, and the remainder of the second fixing layer may protrude outwards from the inner case 222. The second fixing layer 224 may fix the other end of each of the hollow fiber membranes 221 and the inner case 222 to each other. Since the second fixing layer 224 and the first fixing layer 223 are formed so as not to block the hollow portions of the hollow fiber membranes 221, dry gas or wet gas to be supplied from the outside may be supplied to the hollow portions of the hollow fiber membranes 221 without being disturbed by the second fixing layer 224 and the first fixing layer 223, and may be discharged from the hollow portions of the hollow fiber membranes 221 without being disturbed by the second fixing layer 224 and the first fixing layer 223.

The humidifying module 2 may include a plurality of packing members 23 and 23'.

The packing members 23 and 23' form a hermetic seal between the cartridge 22 and the mid-case 21 in order to prevent direct mixing between dry gas and wet gas. The packing members 23 and 23' may be inserted between the cartridge 22 and the mid-case 21. In this case, the cartridge 22 may be inserted into first passing holes 23a and 23a' formed in the packing members 23 and 23'. The packing members 23 and 23' may be disposed at opposite sides of the cartridge 22. Although not shown, resin layers may be formed at opposite sides of the cartridge 22 instead of the packing members 23 and 23'. The resin layers may be formed by hardening a liquid polymer, such as liquid polyurethane resin, using a casting method.

Referring to FIGS. 2 to 4, the first cap 3 is coupled to one end of the humidifying module 2. The space between the first cap 3 and the cartridge 22 may be isolated from the space between the cartridge 22 and the mid-case 21 in a hermetically sealed state by the packing member 23 or the resin layer.

Referring to FIGS. 2 to 4, the second cap 4 is coupled to the other end of the humidifying module 2. The second cap 4 may be coupled to the other end of the humidifying module 2 at a position spaced apart from the first cap 3 in the first-axis direction (X-axis direction). The space between the second cap 4 and the cartridge 22 may be isolated from the space between the cartridge 22 and the mid-case 21 in a hermetically sealed state by the packing member 23' or the resin layer.

Referring to FIGS. 2 to 7, the cartridge 22 may include a second gas inlet 225 and a second gas outlet 226.

Figure 5:
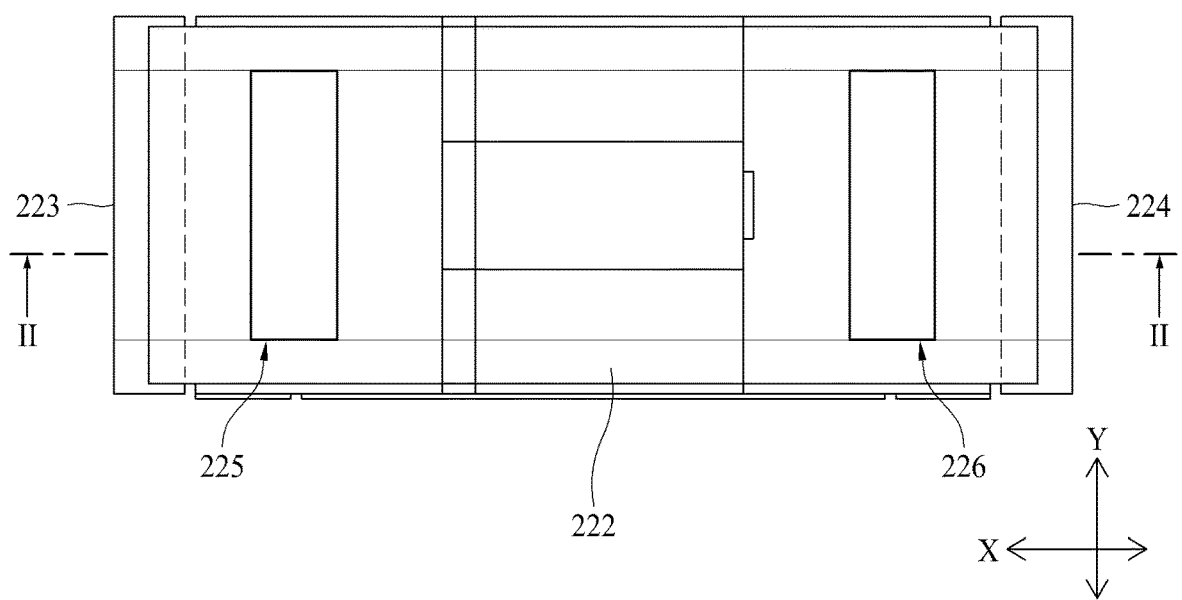
FIGS. 5 and 6 are schematic plan views of a cartridge of the humidifier for fuel cells according to the present disclosure.
Figure 6:
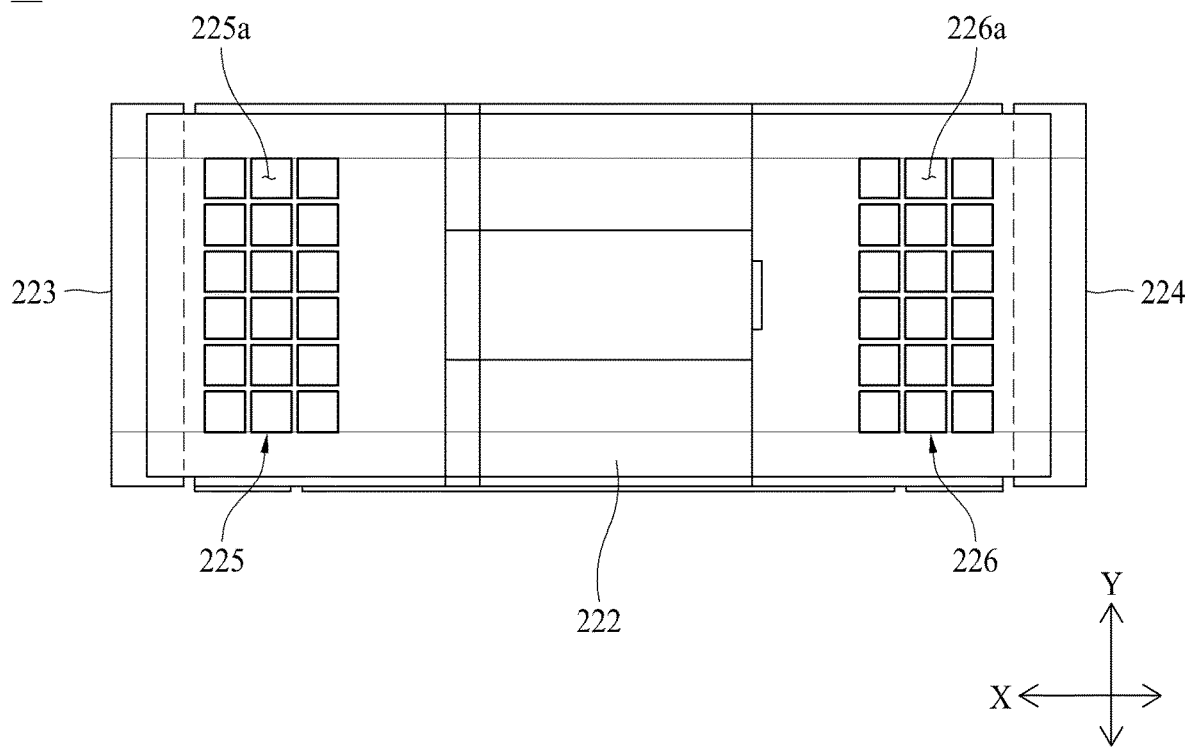
Figure 7:
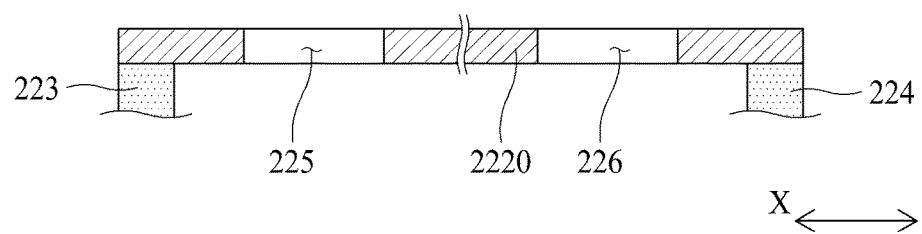
FIG. 7 is a schematic side sectional view showing the cartridge of the humidifier for fuel cells according to the present disclosure, taken along line II-II of FIG. 5.

The second gas inlet 225 is formed in the inner case 222. The second gas inlet 225 may be formed in one side 2220 of the inner case 222. Based on FIG. 7, one side 2220 of the inner case 222 may correspond to an upper surface. The second gas inlet 225 may introduce wet gas or dry gas into the inner case 222. The second gas inlet 225 may be formed through the inner case 222. As shown in FIGS. 5 and 7, the second gas inlet 225 may be implemented by a single through-hole formed through the inner case 222. As shown in FIG. 6, the second gas inlet 225 may be implemented by a plurality of through-holes formed through the inner case 222. In this case, the second gas inlet 225 may include a plurality of introduction windows 225a formed through different parts of the inner case 222. The introduction windows 225a may be disposed spaced apart from each other so as to form a matrix in the first-axis direction (X-axis direction) and a second-axis direction (Y-axis direction). The second-axis direction (Y-axis direction) is an axis direction perpendicular to the first-axis direction (X-axis direction). The second gas inlet 225 and the first fixing layer 223 may be spaced apart from each other in the first-axis direction (X-axis direction). As a result, the second gas inlet 225 and the first fixing layer 223 do not overlap each other. Consequently, it is possible to prevent the first fixing layer 223 from being damaged or broken by the pressure of wet gas or dry gas introduced through the second gas inlet 225.

In FIGS. 5 and 6, a dotted line indicates the position of one surface of the first fixing layer 223 that faces the second gas inlet 225.

The second gas outlet 226 is formed in the inner case 222. The second gas outlet 226 may be formed in one side 2220 of the inner case 222. The second gas outlet 226 may discharge wet gas or dry gas from the inner case 222. The second gas outlet 226 may be formed through the inner case 222. As shown in FIGS. 5 and 7, the second gas outlet 226 may be implemented by a single through-hole formed through the inner case 222. As shown in FIG. 6, the second gas outlet 226 may be implemented by a plurality of through-holes formed through the inner case 222. In this case, the second gas outlet 226 may include a plurality of discharge windows 226a formed through different parts of the inner case 222. The discharge windows 226a may be disposed spaced apart from each other so as to form a matrix in the first-axis direction (X-axis direction) and the second-axis direction (Y-axis direction). The second gas outlet 226 and the second fixing layer 224 may be spaced apart from each other in the first-axis direction (X-axis direction). As a result, the second gas outlet 226 and the second fixing layer 224 do not overlap each other. Consequently, it is possible to prevent the second fixing layer 224 from being damaged or broken by the pressure of wet gas or dry gas discharged through the second gas outlet 226. In FIGS. 5 and 6, a dotted line indicates the position of one surface of the second fixing layer 224 that faces the second gas outlet 226. The second gas outlet 226 and the second gas inlet 225 may be located between the second fixing layer 224 and the first fixing layer 223 in the first-axis direction (X-axis direction). The second gas outlet 226 and the second gas inlet 225 may be disposed at positions spaced apart from each other in the first-axis direction (X-axis direction).

When wet gas flows through the second gas outlet 226 and the second gas inlet 225, the wet gas may be supplied between an inner surface of the mid-case 21 and an outer surface of the inner case 222 through the first gas inlet 212, may be supplied into the inner case 222 through the second gas inlet 225, and may come into contact with the outer surfaces of the hollow fiber membranes 221. During this process, moisture contained in the wet gas may be transmitted through the hollow fiber membranes 221, whereby dry gas flowing along the hollow parts of the hollow fiber membranes 221 may be humidified. The humidified dry gas may be discharged from the hollow fiber membranes 221, and may be supplied to the fuel cell stack through the second cap 4. After humidifying the dry gas, the wet gas may be discharged between the outer surface of the inner case 222 and the inner surface of the mid-case 21 through the second gas outlet 226, and may be discharged from the mid-case 21 through the first gas outlet 213.

When dry gas flows through the second gas outlet 226 and the second gas inlet 225, the dry gas may be supplied between the inner surface of the mid-case 21 and the outer surface of the inner case 222 through the first gas inlet 212, may be supplied into the inner case 222 through the second gas inlet 225, and may come into contact with the outer surfaces of the hollow fiber membranes 221. During this process, moisture in wet gas flowing along the hollow parts of the hollow fiber membranes 221 may be transmitted through the hollow fiber membranes 221, whereby the dry gas introduced into the inner case 222 may be humidified. The humidified dry gas may be discharged between the outer surface of the inner case 222 and the inner surface of the mid-case 21 through the second gas outlet 226, may be discharged from the mid-case 21 through the first gas outlet 213, and may be supplied to the fuel cell stack. After humidifying the dry gas, the wet gas may be discharged from the hollow fiber membranes 221, and may be discharged to the outside through the second cap 4.

Referring to FIGS. 2 to 9, in the humidifier 1 for fuel cells according to the present disclosure, the distance 22D between the second gas inlet 225 and the second gas outlet 226 (hereinafter referred to as a "second distance 22D") may be implemented so as to be greater than the distance 21D between the first gas inlet 212 and the first gas outlet 213 (hereinafter referred to as a "first distance 21D"). Both the second distance 22D and the first distance 21D are based on the first-axis direction (X-axis direction). The second distance 22D may be the distance between a midpoint of the second gas inlet 225 and a midpoint of the second gas outlet 226 in the first-axis direction (X-axis direction). The first distance 21D may be the distance between a midpoint of the first gas inlet 212 and a midpoint of the first gas outlet 213 in the first-axis direction (X-axis direction).

The second distance 22D may be implemented so as to be greater than the first distance 21D in the first-axis direction (X-axis direction). As a result, the first gas inlet 212 and the second gas inlet 225 may be implemented so as not to partially or entirely overlap each other in the first-axis direction (X-axis direction). Consequently, the humidifier 1 for fuel cells according to the present disclosure may be implemented such that the pressure of wet gas or dry gas introduced into the mid-case 21 through the first gas inlet 212 is not directly applied to the hollow fiber membranes 221. This will be described in detail.

Figure 8:
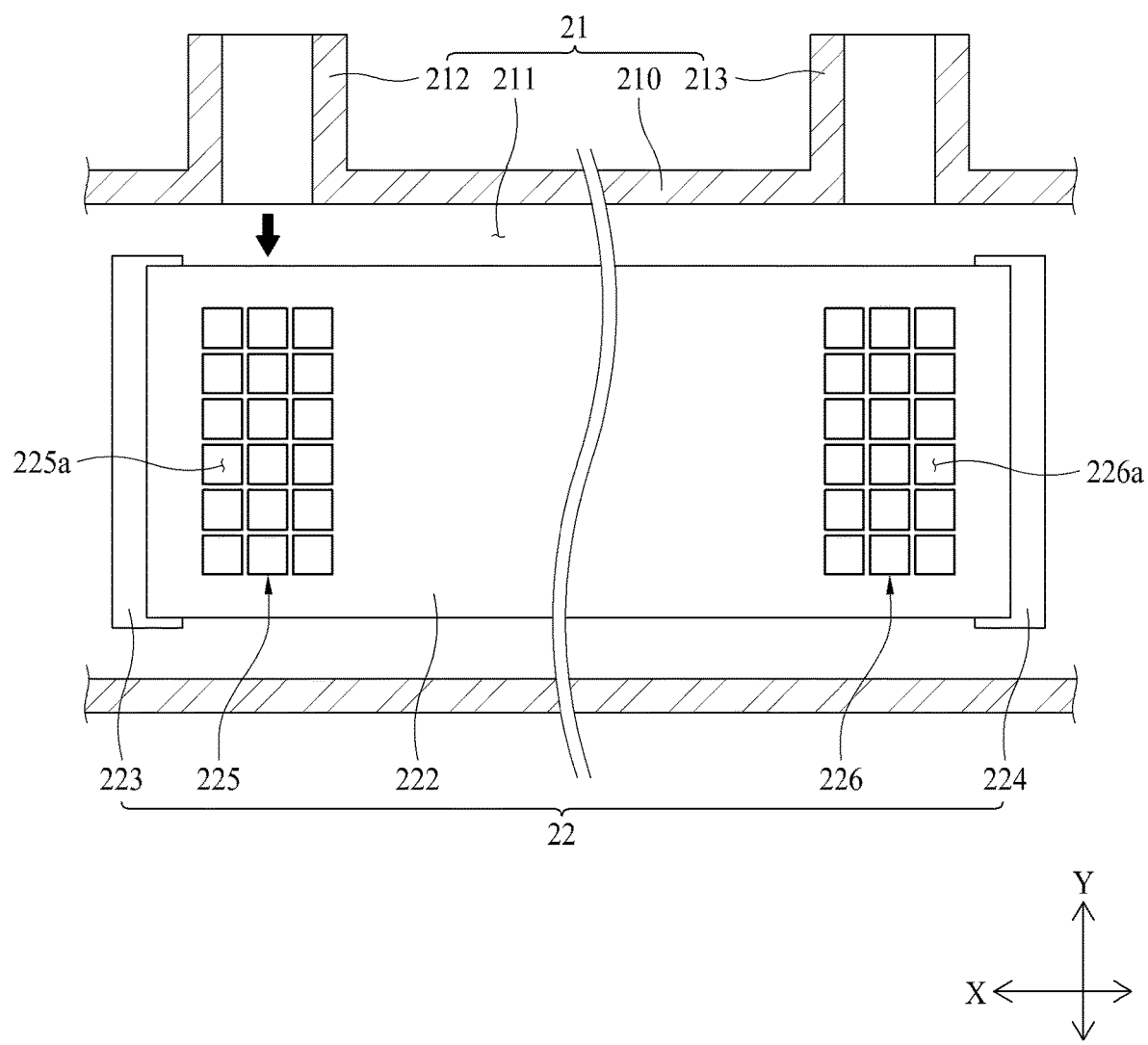
FIGS. 8 to 10 are schematic partial cutaway views showing that the cartridge is located in a mid-case.

First, as shown in FIG. 8, in a comparative example in which the second distance 22D (shown in FIG. 9) and the first distance 21D (shown in FIG. 9) are implemented so as to be approximately equal to each other in the first-axis direction, the first gas inlet 212 and the second gas inlet 225 overlap each other. In the comparative example, therefore, wet gas or dry gas introduced through the first gas inlet 212 flows toward the second gas inlet 225, and is directly introduced into the inner case 222 through the second gas inlet 225. In the comparative example, therefore, the pressure of wet gas or dry gas is directly applied to the hollow fiber membranes 221 (shown in FIG. 3), whereby a danger of the hollow fiber membranes 221 (shown in FIG. 3) being damaged or broken is high.

Figure 9:
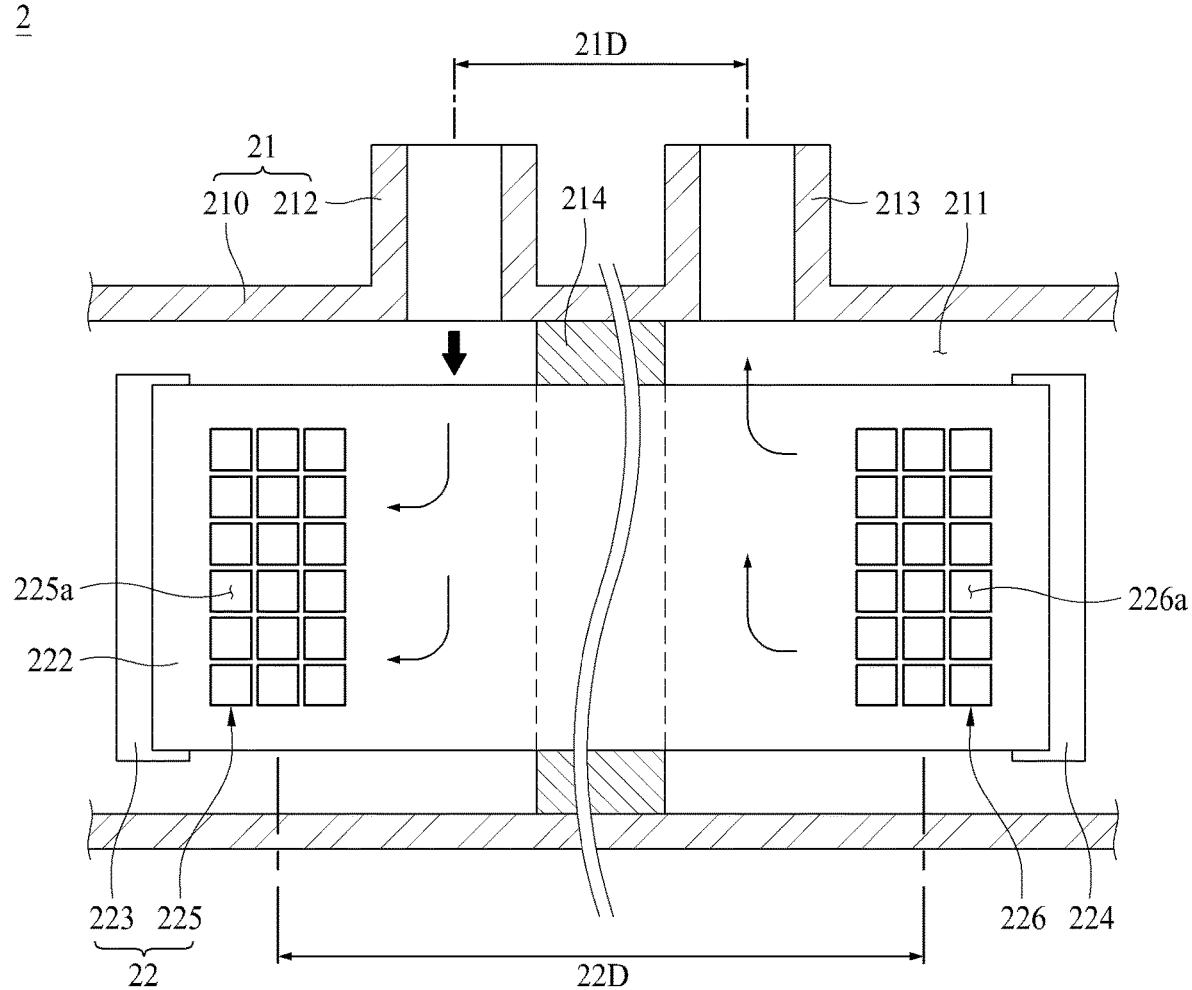
Figure 9:
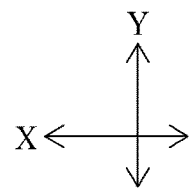

Next, as shown in FIG. 9, in an example in which the second distance 22D is implemented so as to be greater than the first distance 21D in the first-axis direction, the first gas inlet 212 and the second gas inlet 225 do not overlap each other. In this case, the first gas inlet 212 and the second gas inlet 225 may be disposed at positions staggered from each other in the first-axis direction (X-axis direction). In the example, therefore, wet gas or dry gas introduced through the first gas inlet 212 flows to a position spaced apart from the second gas inlet 225, and is introduced into the inner case 222 through the second gas inlet 225. Consequently, the example may be implemented such that the pressure of wet gas or dry gas is not directly applied to the hollow fiber membranes 221 (shown in FIG. 3). In the example, therefore, it is possible to reduce the pressure of wet gas or dry gas applied to the hollow fiber membranes 221, whereby it is possible to reduce a danger of hollow fiber membranes 221 (shown in FIG. 3) being damaged or broken by the pressure of wet gas or dry gas, compared to the comparative example. In the example, therefore, it is possible to extend lifespan and to reduce maintenance expenses, compared to the comparative example. Although not shown, the first gas inlet 212 and the second gas inlet 225 may only partially overlap each other.

The first gas inlet 212 may be spaced apart from each of the second gas inlet 225 and the second gas outlet 226 in the first-axis direction (X-axis direction). Consequently, the entirety of the first gas inlet 212 may be implemented so as not to overlap each of the second gas inlet 225 and the second gas outlet 226. In this case, the first gas inlet 212 may be disposed between the second gas inlet 225 and the second gas outlet 226 in the first-axis direction (X-axis direction).

The first gas outlet 213 may be spaced apart from each of the second gas inlet 225 and the second gas outlet 226 in the first-axis direction (X-axis direction). In this case, the first gas inlet 212 and the first gas outlet 213 may be disposed between the second gas inlet 225 and the second gas outlet 226 in the first-axis direction (X-axis direction). In the humidifier 1 for fuel cells according to the present disclosure, therefore, the first gas inlet 212 and the second gas inlet 225 are disposed so as not to overlap each other, whereby it is possible to reduce damage to or breakage of the hollow fiber membranes 221 and to improve humidification performance using wet gas. This will be described in detail.

First, in a comparative example in which the second gas inlet 225 and the second gas outlet 226 are disposed between the first gas inlet 212 and the first gas outlet 213 in the first-axis direction (X-axis direction), the first gas inlet 212 and the second gas inlet 225 may be disposed so as not to overlap each other. In the comparative example, however, the distance between the second gas inlet 225 and the second gas outlet 226 is reduced, whereby time for which wet gas or dry gas stays in the inner case 222 is reduced, and therefore humidification performance may be lowered.

Next, in an example in which the first gas inlet 212 and the first gas outlet 213 are disposed between the second gas inlet 225 and the second gas outlet 226 in the first-axis direction (X-axis direction), the first gas inlet 212 and the second gas inlet 225 may be disposed so as not to overlap each other, and the distance between the second gas inlet 225 and the second gas outlet 226 may be increased. In the example, therefore, it is possible to reduce damage to or breakage of the hollow fiber membranes 221 due to the pressure of wet gas or dry gas and to increase time for which wet gas or dry gas stays in the inner case 222, whereby it is possible to improve humidification performance Referring to FIGS. 2 to 9, the mid-case 21 may include a partition member 214.

The partition member 214 partitions the interior of the mid-case 21. The partition member 214 may be disposed between the first gas inlet 212 and the first gas outlet 213 in the first-axis direction (X-axis direction). As a result, the partition member 214 may partition the interior of the mid-case 21 into a space connected to the first gas inlet 212 and a space connected to the first gas outlet 213. Consequently, the partition member 214 may prevent wet gas or dry gas introduced through the first gas inlet 212 from being discharged to the first gas outlet 213 without being introduced into the second gas inlet 225.

The partition member 214 may close the gap between the outer surface of the inner case 222 and the inner surface of the mid-case 21. Consequently, the partition member 214 may prevent wet gas or dry gas introduced through the first gas inlet 212 from flowing toward the first gas outlet 213. The partition member 214 may be disposed so as to surround the outer surface of the inner case 222. The inner surface of the mid-case 21 may be disposed so as to surround an outer surface of the partition member 214. As indicated by dotted lines in FIG. 9, the partition member 214 may be disposed so as to cross the interior of the mid-case 21 between the outer surface of the inner case 222 and the inner surface of the mid-case 21.

The partition member 214 may be spaced apart from each of the first gas inlet 212 and the first gas outlet 213 in the first-axis direction (X-axis direction). Consequently, the first gas inlet 212 may be located between the second gas inlet 225 and the partition member 214 in the first-axis direction (X-axis direction). The first gas outlet 213 may be located between the second gas outlet 226 and the partition member 214 in the first-axis direction (X-axis direction).

Figure 10:
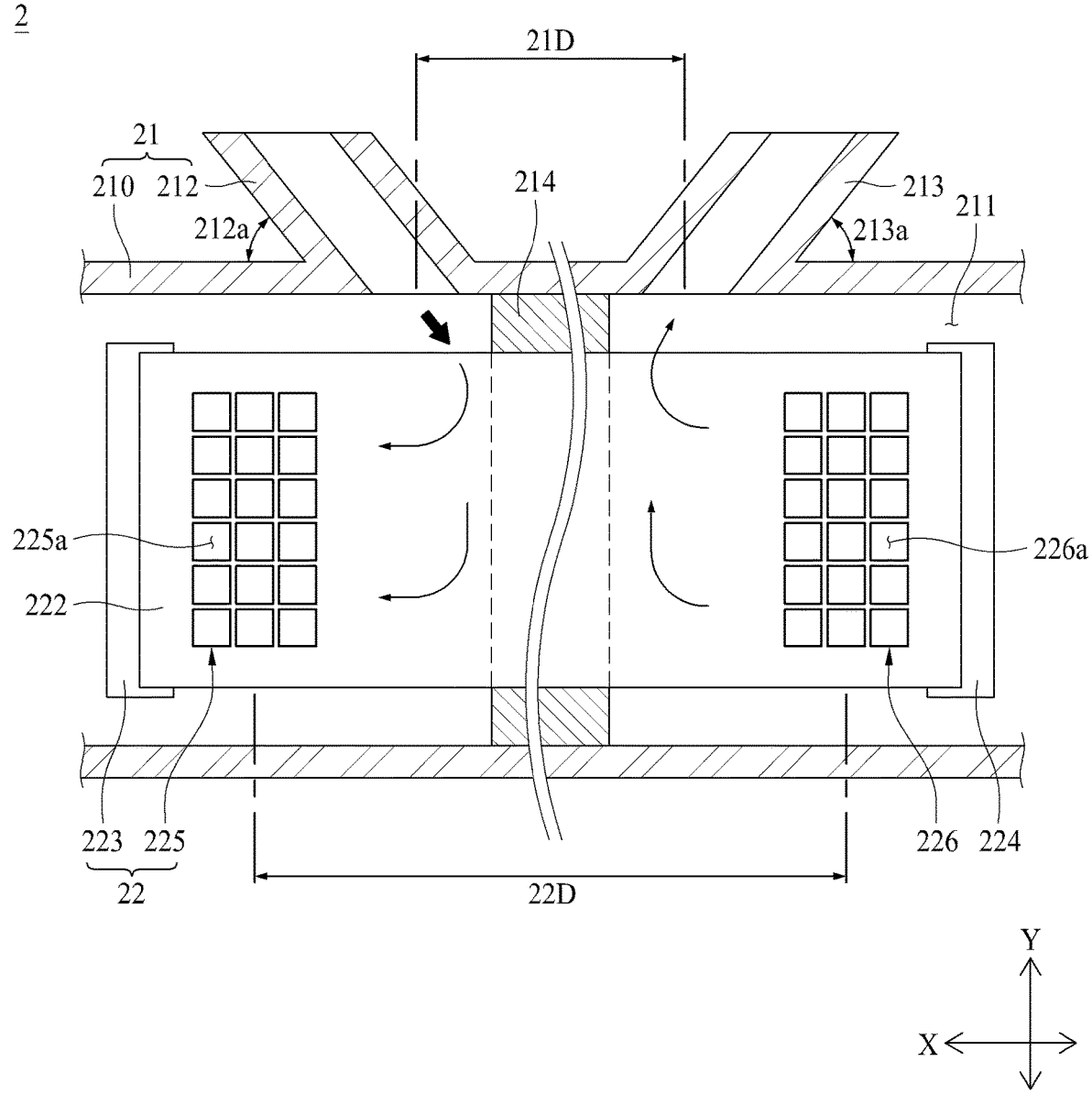

Referring to FIG. 10, in the humidifier 1 for fuel cells according to the present disclosure, the first gas inlet 212 may be formed so as to be inclined. The first gas inlet 212 may be formed so as to be inclined such that the distance from the second gas inlet is increased as the first gas inlet extends toward the mid-case 21. Consequently, the humidifier 1 for fuel cells according to the present disclosure may be implemented such that wet gas or dry gas is introduced through the first gas inlet 212 in a direction away from the second gas inlet 225, whereby it is possible to further reduce the pressure of wet gas or dry gas applied to the hollow fiber membranes 221. The wet gas or dry gas introduced through the first gas inlet 212 may flow toward the partition member 214. Afterwards, the flow direction of the wet gas or dry gas may be changed toward the second gas inlet 225 by the partition member 214, whereby the wet gas or dry gas may be introduced into the inner case 222 through the second gas inlet 225.

The first gas inlet 212 may be disposed so as to be inclined such that an included angle 212a of 10 degrees to 90 degrees is formed between the first gas inlet and the mid-case 21. If the included angle 212a between the first gas inlet 212 and the mid-case 21 is greater than 90 degrees, wet gas or dry gas introduced through the first gas inlet 212 flows toward the second gas inlet 225, whereby a danger of hollow fiber membranes 221 being damaged or broken by the pressure of the wet gas or dry gas may rise. If the included angle 212a between the first gas inlet 212 and the mid-case 21 is less than 10 degrees, connection of an introduction port (not shown) to the first gas inlet 212 may be difficult. In consideration thereof, the included angle 212a between the first gas inlet 212 and the mid-case 21 may be implemented so as to be 10 degrees to 90 degrees. In the humidifier 1 for fuel cells according to the present disclosure, therefore, it is possible to reduce a danger of hollow fiber membranes 221 being damaged or broken by the pressure of wet gas or dry gas introduced through the first gas inlet 212 and to improve ease in connecting the introduction port to the first gas inlet 212.

The first gas outlet 213 may be formed so as to be inclined. The first gas outlet 213 may be formed so as to be inclined such that the distance from the second gas outlet 226 is increased as the first gas outlet extends toward the mid-case 21. In this case, the first gas outlet 213 and the first gas inlet 212 may be formed so as to be inclined such that the distance therebetween is reduced as the first gas outlet and the first gas inlet extend toward the mid-case 21. When each of the first gas outlet 213 and the first gas inlet 212 is formed so as to be inclined, the first distance 21D may mean the distance between a point at which the first gas inlet 212 and the interior of the mid-case 21 are connected to each other and a point at which the first gas outlet 213 and the interior of the mid-case 21 are connected to each other.

The first gas outlet 213 may be disposed so as to be inclined such that an included angle 213a of 10 degrees to 90 degrees is formed between the first gas outlet and the mid-case 21. If the included angle 213a between the first gas outlet 213 and the mid-case 21 is greater than 90 degrees, wet gas or dry gas discharged through the second gas outlet 226 flows toward the first gas outlet 213. As a result, the pressure of the wet gas or dry gas discharged through the second gas outlet 226 may increase, whereby a danger of hollow fiber membranes 221 being damaged or broken by the pressure of the wet gas or dry gas may rise. If the included angle 213a between the first gas outlet 213 and the mid-case 21 is less than 10 degrees, connection of a discharge port (not shown) to the first gas outlet 213 may be difficult. In consideration thereof, the included angle 213a between the first gas outlet 213 and the mid-case 21 may be implemented so as to be 10 degrees to 90 degrees. In the humidifier 1 for fuel cells according to the present disclosure, therefore, it is possible to reduce a danger of hollow fiber membranes 221 being damaged or broken by the pressure of wet gas or dry gas discharged through the second gas outlet 226 and to improve ease in connecting the discharge port to the first gas outlet 213.

Referring to FIGS. 2 to 10, in the humidifier 1 for fuel cells according to the present disclosure, the first gas inlet 212 and the second gas inlet 225 may be disposed so as to face in different directions. In the humidifier 1 for fuel cells according to the present disclosure, therefore, wet gas or dry gas introduced through the first gas inlet 212 may move in a direction toward the second gas inlet 225 and may then be introduced through the second gas inlet 225, whereby it is possible to further reduce the pressure of wet gas or dry gas applied to the hollow fiber membranes 221. In the humidifier 1 for fuel cells according to the present disclosure, therefore, it is possible to further reduce a danger of hollow fiber membranes 221 being damaged or broken by the pressure of wet gas or dry gas. For example, when the second gas inlet 225 is formed in the upper surface of the inner case 222, the first gas inlet 212 may be disposed so as to face a side surface of the inner case 222.

The first gas outlet 213 and the second gas outlet 226 may be disposed so as to face in different directions. In the humidifier 1 for fuel cells according to the present disclosure, therefore, wet gas or dry gas discharged through the second gas outlet 226 may move in a direction toward the first gas outlet 213 and may then be discharged through the first gas outlet 213. For example, when the second gas outlet 226 is formed in the upper surface of the inner case 222, the first gas outlet 213 may be disposed so as to face the side surface of the inner case 222.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to the other end of the humidifying module, wherein the humidifying module comprises:
a mid-case open at opposite ends thereof;
a partition member configured to partition an interior of the mid-case; and
at least one cartridge disposed in the mid-case, the cartridge comprising a plurality of hollow fiber membranes,
wherein the cartridge comprises an inner case open at opposite ends thereof, the hollow fiber membranes being received in the inner case,
the mid-case comprises a first gas inlet and a first gas outlet, the first gas inlet and the first gas outlet being formed spaced apart from each other in a first-axis direction,
the inner case comprises a second gas inlet and a second gas outlet, the second gas inlet and the second gas outlet being formed spaced apart from each other in the first-axis direction, and
a distance between the second gas inlet and the second gas outlet is greater than a distance between the first gas inlet and the first gas outlet in the first-axis direction, and
wherein the partition member is disposed between the first gas inlet and the first gas outlet in the first-axis direction.

2. The humidifier according to claim 1, wherein the first gas inlet is spaced apart from each of the second gas inlet and the second gas outlet in the first-axis direction.

3. The humidifier according to claim 1, wherein the first gas inlet and the first gas outlet are disposed between the second gas inlet and the second gas outlet in the first-axis direction.

4. The humidifier according to claim 1, wherein the partition member is spaced apart from each of the first gas inlet and the first gas outlet in the first-axis direction.

5. The humidifier according to claim 1, wherein the partition member closes a gap between an outer surface of the inner case and an inner surface of the mid-case, thereby preventing wet gas or dry gas introduced through the first gas inlet from flowing toward the first gas outlet.

6. The humidifier according to claim 1, wherein the first gas inlet is formed so as to be inclined such that a distance from the second gas inlet is increased as the first gas inlet extends toward the mid-case.

7. The humidifier according to claim 6, wherein the first gas inlet is inclined such that an included angle of 10 degrees to 90 degrees is formed between the first gas inlet and the mid-case.

8. The humidifier according to claim 1, wherein the first gas outlet is formed so as to be inclined such that a distance from the second gas outlet is increased as the first gas outlet extends toward the mid-case.

9. The humidifier according to claim 8, wherein the first gas outlet is inclined such that an included angle of 10 degrees to 90 degrees is formed between the first gas outlet and the mid-case.

10. The humidifier according to claim 1, wherein the first gas inlet and the second gas inlet are disposed at positions staggered from each other in the first-axis direction.

11. The humidifier according to claim 1, wherein the first gas inlet and the second gas inlet are disposed so as to face in different directions.

12. The humidifier according to claim 1, wherein the first gas outlet and the second gas outlet are disposed so as to face in different directions.

13. The humidifier according to claim 1, wherein the cartridge comprises a first fixing layer configured to fix one end of each of the hollow fiber membranes, and the first fixing layer and the second gas inlet are spaced apart from each other in the first-axis direction.

14. The humidifier according to claim 13, wherein
the cartridge comprises a second fixing layer configured to fix the other end of each of the hollow fiber membranes,
the second gas inlet and the second gas outlet are located between the first fixing layer and the second fixing layer in the first-axis direction, and
the second fixing layer and the second gas outlet are spaced apart from each other in the first-axis direction.

15. The humidifier according to claim 11, wherein the first gas outlet and the second gas outlet are disposed so as to face in different directions.

\* \* \* \* \*